US009712333B2

(12) United States Patent
Carino et al.

(10) Patent No.: US 9,712,333 B2
(45) Date of Patent: Jul. 18, 2017

(54) BILATERAL CHAT FOR INSTANT MESSAGING

(71) Applicant: THOMSON REUTERS GLOBAL RESOURCES, Baar (CH)

(72) Inventors: Alan Carino, Greenwich, CT (US); Allen Grambling Harvey, Jr., New York, NY (US); Lesli Veronica Fairchild, Surrey (GB); Damien John Patrick Corr, New York, NY (US); Suresh Radhakrishnan, Islandia, NY (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 206 days.

(21) Appl. No.: 14/704,093

(22) Filed: May 5, 2015

(65) Prior Publication Data
US 2015/0319111 A1 Nov. 5, 2015

Related U.S. Application Data

(60) Provisional application No. 61/988,343, filed on May 5, 2014.

(51) Int. Cl.
*G06F 15/16* (2006.01)
*H04L 12/18* (2006.01)
*H04L 12/58* (2006.01)

(52) U.S. Cl.
CPC .......... *H04L 12/1822* (2013.01); *H04L 51/04* (2013.01)

(58) Field of Classification Search
CPC .......................... H04L 12/1818; H04L 51/04
USPC .................................................. 709/204, 206
See application file for complete search history.

(56) References Cited

U.S. PATENT DOCUMENTS

| 2002/0174234 | A1* | 11/2002 | Trovato .............. H04L 12/1818 709/227 |
| 2004/0215610 | A1* | 10/2004 | Dixon .................... G06Q 10/10 |
| 2006/0176831 | A1* | 8/2006 | Greenberg ............ H04L 12/581 370/260 |
| 2008/0126481 | A1 | 5/2008 | Chakra et al. |
| 2009/0037538 | A1 | 2/2009 | Callanan et al. |
| 2010/0017753 | A1 | 1/2010 | Li et al. |
| 2011/0093599 | A1 | 4/2011 | Baratz et al. |

OTHER PUBLICATIONS

International Preliminary Report on Patentability, Nov. 8, 2016.
PCT International Search Report and Written Opinion of the International Searching Authority, Aug. 4, 2015.

* cited by examiner

*Primary Examiner* — Wing F Chan
*Assistant Examiner* — Andrew Woo

(57) ABSTRACT

Systems and technologies for providing an electronic bilateral chat room are disclosed. Users of the system may be screened against a database of organizations having hierarchal information relating to parent organization for which the user is associated, including parent subsidiaries, joint ventures and affiliates. While a bilateral chat room is limited to users in only two organizations, the present disclosure also allows other users that are associated with the structure of the parent organization to be included in the chat room.

27 Claims, 13 Drawing Sheets

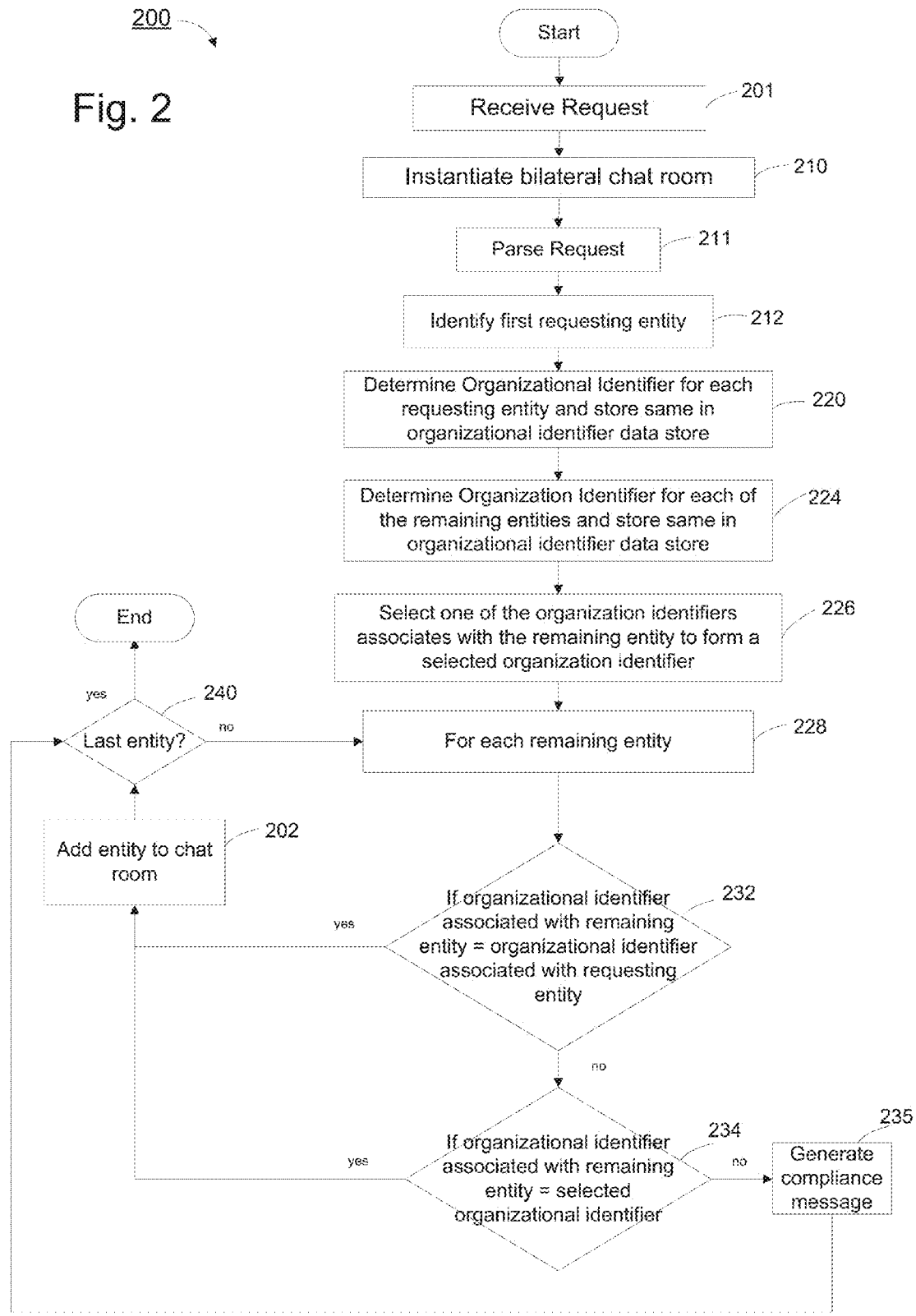

| | |
|---|---|
| Ultimate Parent (UP) | • Represents the global head quarters of a given company.<br>• All applicable LE subsidiaries are grouped beneath the same UP |
| Legal Entity (LE) | • This corresponds to the head office or registered office of a given company in a given country<br>• Account against which orders are created (i.e.: where asset is contracted)<br>• All applicable branches are grouped beneath their respective LE |
| Location Account | • A physical site which is a department or branch of a given legal entity<br>• Determines the installation/shipping address (i.e.: where asset is installed or where users are based)<br>• A legal entity can act as a location account too |

Fig. 5

BILATERAL CHAT FOR INSTANT MESSAGING

CROSS-REFERENCE TO RELATED APPLICATION

This application claims priority to U.S. Provisional Application No. 61/988,343, filed May 5, 2014, entitled "Desk Messaging", the content of which is incorporated herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright © 2015 Thomson Reuters.

TECHNICAL FIELD

This disclosure relates to communication between parties through a messaging system, and more particularly methods and systems for establishing a bilateral chat room.

BACKGROUND

A chat room is a venue where multiple users, usually sharing a common interest, can communicate with each other through the internet or other computer networks. Examples of chat rooms include, but are not limited to online chats, instant messaging and online forums. Communication in a chat room is not limited to just text but can include other sources of communication (e.g. file share, webcams, audio).

In the context used by financial professionals, there are specific types of chat rooms, including unilateral chat rooms, bilateral chat rooms, and multilateral chat rooms). Unilateral chat rooms concern communication between users within one organization, bilateral chat rooms concern communication between users in only two organizations and multilateral chat rooms concern communication between users of multiple organizations.

Recent regulatory investigations have highlighted the unauthorized use of multilateral chats by market participants, where traders from more than two organizations joined restricted member chat rooms with the sole purpose to collude and manipulate market rates for their own commercial gain. These multilateral chats are contrary to bilateral chats which are widely accepted as forums for members from two organizations to meet and to conduct legitimate business. However, detecting whether a conversation is on a bilateral or multilateral firm basis can be extremely difficult to detect given the number of aliases used across different messaging systems that can mask the actual identity and organizational association of room participants. For example, if a user registers for an account on a consumer network, their username and login ID may take the form e.g.: username@consumerdomain.co* and there exists no automatic method to authenticate the user or their association to an organizational entity. If multiple users with similar credentials are all present in a chat room, it becomes increasingly difficult to detect how many firms have members present in the room.

Furthermore, the regulatory reforms, unprecedented fines, reputational damage and, for some, criminal charges that have occurred as a result of scandals has forced many institutions to review their structures, their cultures and in particular their use of chat rooms on instant messaging systems. For many, this has resulted in the creation of central administration teams with designated responsibility for managing all chat rooms joined or created on behalf of their users with the sole aim of ensuring enforcement of bilateral communications Typically this requires a workflow to ensure all new room requests and associated business approvals are routed to the central team for action. It also requires an administrator interface for the central teams to configure and manage their rooms, which only adds to the complexity.

Accordingly, improved systems and techniques are needed to enforce bilateral communications without the onerous and expensive administrative overhead and to allow financial professionals to communicate with their counterparties whilst also adhering to compliance standards.

SUMMARY

Systems and technologies for providing an electronic bilateral chat room are disclosed.

Users of the system may be screened against a database of organizations having hierarchal information relating to a 'parent' organization for which each user is associated, including the parent, its subsidiaries, joint ventures and affiliates, all based on legitimate legal entity data. While a bilateral chat room is limited to users associated with only two organizations, the present disclosure also allows other users that are associated with the structure of the parent organization to be included in the chat room. In one implementation, a database of organizations, such as THOMSON REUTERS LEGAL ENTITY DATA™ is accessed to provide the structure of organizations and may be constantly maintained to contain current information.

Various aspects of the system relate to a bilateral chat room. For example, according to one aspect, a computer-implemented method includes receiving an electronic request to establish an electronic bilateral chat room for communication between a first entity and a set of second entities, identifying a first top level or 'parent' organizational identifier associated with the first entity using an organizational database and identifying a set of second top level 'parent' organizational identifiers, each member of the set of second top level organization identifiers corresponding to one member of the set of second entities using the organizational database.

The method further including instantiating automatically the electronic bilateral chat room, adding automatically the first entity to the electronic bilateral chat room, selecting one member of the set of second top level organization identifiers to form a selected top level organization identifier, and adding automatically at least one member of the set of second entities to the electronic bilateral chat room if the member of the set of second top level organization identifiers corresponding to the at least one member of the set of second entities matches the selected top level organization identifier.

In one implementation, the set of second entities may be stored in a queue and may contain one or more entities.

In another implementation, the bilateral chat room is associated with the first top level organizational identifier and the selected top level organizational identifier and therefore the room is associated with at most two different top level organizational identifier entities. As the system parses through the list of entities from the request, it will automatically add the entity if the entity's top level organization identifier matches either, as previously determined in the above steps, the first top level organizational identifier or the selected top level organization identifier.

In another implementation, the system automatically adds one member at a time of the set of second entities to the electronic bilateral-only chat room and associates the room with each entity's top level organizational identifier until the number of top level entities associated with the bilateral chat room equals two. The system continues adding automatically the remaining members, one member at a time of the set of second entities, to the electronic bilateral-only chat room if and only if each subsequent entity's top level organizational identifier matches either one or the other of the two top level organizational identifiers associated with the room.

In yet another implementation, when a user from a third organization is invited to join by an existing member of an instantiated chat room for which two organizational identifiers have been defined, the system blocks their addition to the chat room. Under such circumstances, a message may be displayed to the entity which initiated the invite with a description as to why the member of the third entity is not allowed to join the bilateral chat room.

In one implementation, any entity included in the bilateral chat room has the ability to instantiate a separate bilateral chat room, terminate their participation in a chat room, or invite more users into the chat room, as long as the new entities fall within the bilateral guidelines stated above.

In another implementation, the bilateral chat room can be terminated based on an activity level associated with the electronic bilateral chat room over a predefined period of time.

Entities for inclusion in a chat room can be selected from a local contact list or be identified using a network accessible directory. In one implementation, notations may be associated with an entity's profile on a list of contacts to indicate entities, such as users, belonging to the same organization, as determined by the hierarchal organizational database.

In another implementation, notations may be associated with an entity's profile on a list of contacts that indicates pre-established compliance controls that prohibit communication with at least one other entity.

The system may also determine if an entity is online and block electronic communications to the entity if the entity is not online. In one implementation, for example, if an entity leaves the bilateral chat room and would like to rejoin, the system revalidates the entity under the guidelines stated above.

A system, as well as articles that include a machine-readable medium storing machine-readable instructions for implementing the bilateral chat room is disclosed. Details of various implementations are discussed in greater detail below.

In some implementations, one or more of the following advantages may be present:

For example, the system can provide compliance analysis through a compliance policy engine, which executes logic for not allowing more than two top level organizations in a chat room.

The compliance policy engine can also contain pre-established compliance controls that prohibit communication with at least one other entity.

A further benefit of the system may relate to accuracy. For example, the system may rely on a trusted and established database of organizations to determine organization information. Advantageously, the screening against such a database of organizations may eliminate the need for customers to invest in expensive and time-consuming counterparty validation exercises. The resulting chat can be immediately compliant and reduces the burden on administrators while avoiding any unauthorized multilateral chats from taking place.

Additional features and advantages will be readily apparent from the following detailed description, the accompanying drawings and the claims.

BRIEF DESCRIPTION OF THE DRAWINGS

FIG. 2 is an exemplary flow chart of one implementation of the disclosure;

FIG. 5 illustrates example organizational definitions used in determining an organizational hierarchy.

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

Figure 1:
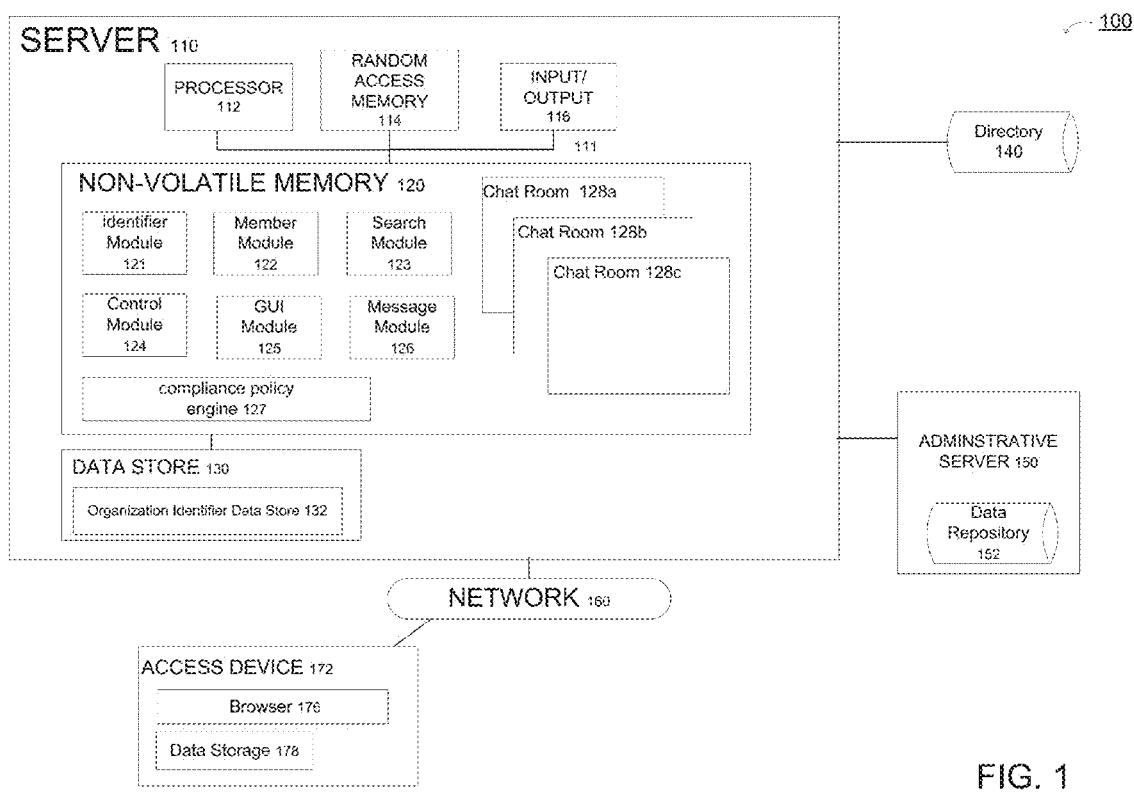
FIG. 1 is a schematic of a system according to one implementation of the disclosure.

FIG. 1 shows an exemplary system 100 for providing an electronic chat room. As used herein, the term "entity" can be used to describe a user, person, individual, group, team, or trading desk. The term "organization" is used to describe any company, firm, corporation, institution, group of consortium, conglomerate, agency, associations, society, or charity. The phrase "top level organization" refers to any organization having a controlling stake in one or more other organizations and is synonymous with the phrase "ultimate parent company." The term "organizational database" refers to organizational information computed by the administrative server with information from a data repository. Examples of chat rooms created by a server include but are not limited to bilateral chat rooms, multilateral chat rooms and chat rooms provided by THOMSON REUTERS EIKON®.

As shown in FIG. 1, in one implementation, the system 100 is configured to include an access device 172 that is in communication with a server 110 over a network 160. Access device 172 can include a personal computer, laptop computer, or other type of electronic device, such as a cellular phone. In one implementation, for example, the access device 172 is coupled to I/O devices (not shown) that include a keyboard in combination with a point device such as a mouse for sending chat room request to the server 110. Preferably, the memory of the access device 172 is configured to include a browser 176 that is used to request and receive information from server 110. Communication between the browser 176 of the access device 172 and server 110 may utilize a XMPP protocol. Browser 176 may be configured to a data storage 178, which may include a user's contact list for creation of chat rooms. Although one access device 172 is shown in FIG. 1, the system can support one or multiple access devices.

The network 160 can include various devices such as routers, servers, and switching elements connected in an Intranet, Extranet or Internet configuration. In some implementations, the network 160 uses wired communications to transfer information between the access device 172 and server 110. In another implementation, the network 160 employs wireless communication protocols. In yet other implementations, the network 160 employs a combination of wired and wireless technologies.

As shown in FIG. 1, in one implementation, the server device 110 preferably includes a processor 112, such as a central processing unit ('CPU'), random access memory ('RAM') 114, input-output devices 116, such as a display device (not shown), and non-volatile memory 120, all of which are interconnect via a common bus 111 and controlled by the processor 112.

In one implementation, as shown in the FIG. 1 example, the non-volatile memory 120 is configured to include an identifier module 121 for identifying organizational identifiers, a member module 122 for processing and maintaining chat room membership entities, and a search module 123 for finding local users and users in a global listing directory 140 with an associated data repository. In one implementation, as shown in FIG. 1, the directory 140 is network accessible. In an alternative implementation, the directory 140 is included in the non-volatile memory 120 of the server 110. The directory 140 may also include additional information associated with each entity (For example, one or more asset classes traded by the entity and/or hours of operation of the entity).

As shown in the FIG. 1 example, the non-volatile memory further includes a control module 124 for instantiating, terminating, and blocking entities, such as users, from joining the bilateral chat room 128a based upon predefined rules. As shown in FIG. 1, the non-volatile memory may also provide for more than one electronic chat room (128a-c), each of which may be an electronic bilateral chat room. A chat room is a venue where multiple users, usually sharing a common interest, can communicate with each other through the internet or other computer networks. Access may be based on invitation and messages can be posted into the room by any member. Members can leave the venue (e.g. by logging out) and rejoin at their discretion. On rejoin, members have the ability to access any messages that were posted into the venue whilst they were absent. For example, the Global Markets Forum, a multi-lateral chat room on THOMSON REUTERS EIKON MESSENGER™ curated by Thomson Reuters journalists is a venue that is used by its members to discuss markets, industry and world affairs.

In one implementation, the non-volatile memory 120 further comprises a GUI module 125 for providing a user interface for display in browser 176 of access device 172, and a message module 126 for providing communication between the server 110 and one or more access devices. For example, in one implementation, the message module 126 uses a messaging service such as Thomson Reuters Eikon Messenger™ and a compliance policy engine 127 that communicates with administrative server 150 to evaluate inclusions of entities into the bilateral chat room as discussed below.

The administrative server 150 includes a processor (not shown), random access memory (not shown) and non-volatile memory (not shown) which are interconnected via a common bus and controlled by the processor. The administrative sever 150 is configured to receive organizational information, such as relationships among organizations from a data repository 152 accessible to the administrative server 150. In one implementation, the data repository 152 is THOMSON REUTERS LEGAL ENTITY DATA™, and as such, determines the top level organization of an entity. THOMSON REUTERS LEGAL ENTITY DATA™ is a repository that holds details of more than 88000 organizations, comprising more than 1 million legal entities, across 250 markets. Maintained by approximately 300 analysts, supporting 50+ languages from more than 1500 approved sources, all confirmed changes are automatically applied to THOMSON REUTERS EIKON MESSENGER™ for compliance enforcement of bilateral chat. In one implementation, the administrative server 150 is configured to directly communicate with the server 110 and the information determined by the administrative server 150 may be utilized by one or more software modules 121, 122, 123, 124, 125, 126, 127, 128. In another implementation, the administrative server 150 is included in the nonvolatile memory 120 of server 110. In yet another implementation, the administrative server 150 communicates with the server 110 over the network 160.

As shown in the exemplary FIG. 1, a data store 130 is provided that is utilized by one or more of the software modules 121, 122, 123, 124, 125, 126, 127, 128 to access and store information relating to chat rooms. In one implementation, the data store 130 is a relational database. In another implementation, the data store 130 is a file server. In yet other implementations, the data store 130 is a configured area in the non-volatile memory 120 of server 110. Although the data store 130 shown in FIG. 1 is part of the server 110, it will be appreciated by one skilled in the art that the data store 130 can be distributed across various servers and be accessible to the server 110 over the network 160. As shown in FIG. 1, in one implementation, the data store 130 is configured to include an organization identifier data store 132.

The organization identifier data store 132 includes information relating to entities. For example, in one implementation, the organization identifier data store 132 includes top level organization identifiers associated with entities determined by the identifier module 121 using the administrative server 150. It should be noted that the system 100 shown in FIG. 1 is one implementation of the disclosure. Other system implementations of the disclosure may include additional structures that are not shown, such as secondary storage and additional computational devices. In addition, various other implementations of the disclosure include fewer structures than those shown in FIG. 1.

Figure 3A:
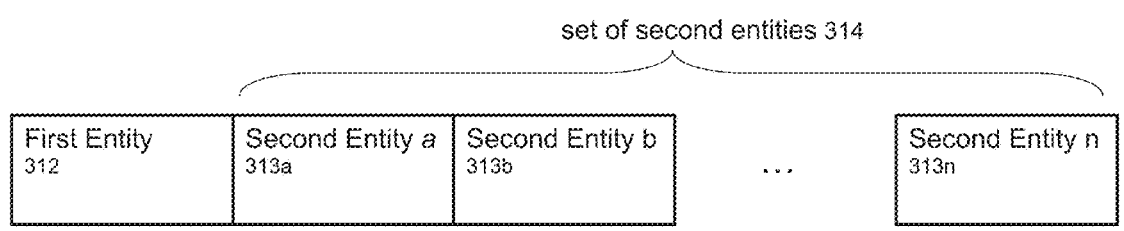
FIG. 3a illustrates parts of an exemplary message request to instantiate a bilateral chat room.

Referring now to FIGS. 1, 2 and 3a, an exemplary method 200 of generating an electronic bilateral chat room is discussed. As shown in the FIG. 2, at step 201, an electronic request to establish an electronic bilateral chat room is received by the message module 126 from the browser 176 sent over the network 160. An exemplary part of the request, as illustrated in FIG. 3a, includes a first entity identifier 312 and a set of second entities identifiers (313a . . . 313n). As shown in the FIG. 3a example, the set of second entities 314 includes a first member entity 313a, a second member entity 313b, etc. through n member entities representing the last member of the set of second entities 314.

Turning back to FIG. 2, upon receiving the request at step 201, the control module 124 at step 210 instantiates the bilateral chat room. Once instantiated, the bilateral chat room is now available for additional users from the two entities to be added. In one implementation, the GUI module 125 updates display presented to the user based on communication between the GUI module 125 and the browser 176. Next, at step 211, the member module 122 parses through each entity identifier in the request and at step 212 determines which entity initiated the request. As used herein, the requesting entity and the first entity are used interchangeably. Once the member module 122 identifies the first entity identifier, the control module 124 adds the first entity identifier to the bilateral chat room.

Next at step 220, the identifier module 121 receives from the administrative server 150 the ultimate parent for each entity included in the request. The identifier module 121 then determines from the information received from the administrative server 150, a first top level organizational identifier for the requesting entity and, at step 224, for each of the remaining entities in the request a top level organizational identifier. The identifier module 121 then stores the organizational identifiers in the organizational identifier data store 132.

Figure 3B:
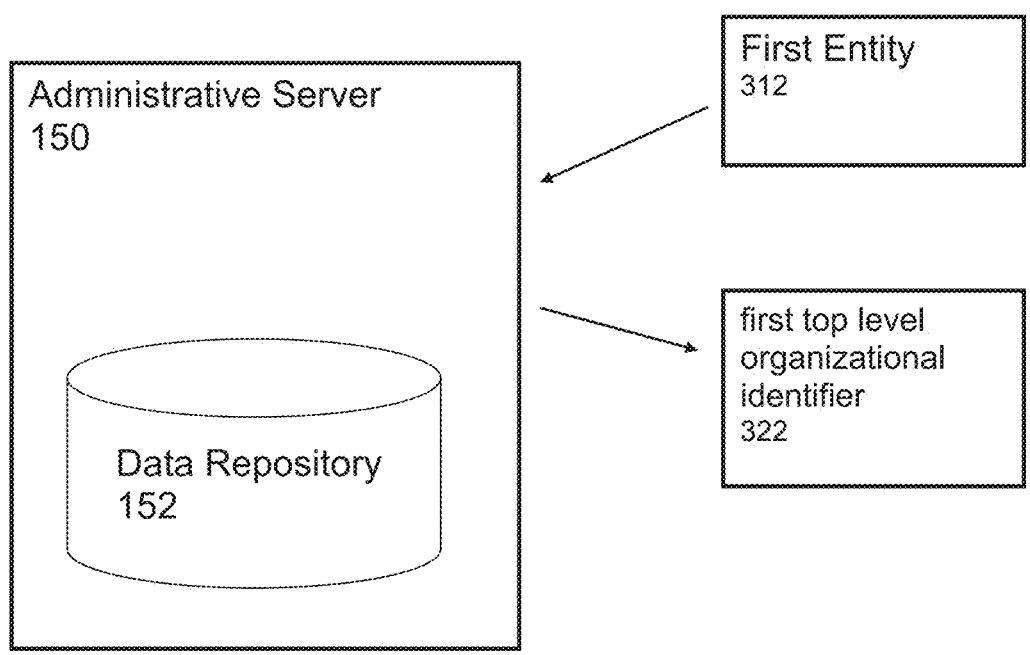
FIG. 3b is a schematic of a first top level organizational identifier determination.

Referring now to FIG. 3b, an example schematic showing the determination of a first top level organizational identifier is disclosed. As shown in the FIG. 3b example, an administrative server 150 accesses organizational information from the data repository 152 associated with the requesting entity 312 to determine the first top level organizational identifier 322. While FIG. 3b only depicts determination of the first top level organizational identifier 322, it will be appreciated by one skilled in the art that this process may be repeated for any number of entities included in the request and is not limited to only the first entity 312.

In step 226, the identifier module 121 then determines a Selected Top level Organization Identifier from the set of Organization Identifiers determined in step 224. In one implementation, the identifier module 121 stores the Selected top Level Organization Identifier in the organization identifier data store 132 of data store 130. A schematic showing selection of the selected top level organization identifier 326 is shown in connection with FIG. 3d.

Next at step 228, for each member of the set of second entities, the member module 122 transmits each member entity to the compliance policy engine 127 for evaluation. The information determined at steps 220, 224 and 226 are forwarded by identifier module 121 to compliance policy engine 127 to be used in evaluation step 232 and 234.

In one implementation, as shown in step 232, if the compliance policy engine 127 determines that the organizational identifier associated with the member entity equals the organizational identifier associated with the requesting entity, at step 202, the compliance policy engine 127 transmits a signal to the control module 124 to add the member entity to the chat room. Otherwise, at step 234, the compliance policy engine 127 determines if the organizational identifier associated with the member entity equals the selected organizational identifier. If the compliance policy engine 127 determines that the organizational identifier associated with the member entity equals the selected organizational identifier, at step 202, the compliance policy engine 127 transmits a signal to the control module 124 to add the member entity to the chat room. Otherwise, at step 235, the compliance policy engine 127 transmits a signal to the GUI module 125 to generate a compliance message for display to the requesting entity.

In another implementation, the compliance policy engine 127 can also evaluate pre-established compliance controls. An exemplary pre-established compliance control would be one that prohibits communication with at least one other entity.

Lastly, at step 240, the member module 122 determines whether the last member of the set of second entities 314 have been processed by the compliance policy engine 127. If the last member of the set of second entities has not been processed by the compliance policy engine 127, steps 228, 232, 234 and optionally steps 202 and 235 are repeated as described previously. The resulting bilateral chat room comprises only entities that are in the same organization as the First Top Level Organizational Identifier or Selected Top Level Organization Identifier, as illustrated in FIG. 3e.

Referring now to FIGS. 3a and 3c-3e, further details of a partial exemplary message request are shown. FIG. 3a shows a portion of an exemplary message request to instantiate a bilateral chat room with a payload comprising a first entity 312, which in one implementation is a requesting entity to create the bilateral chat room, and a set of second entities 314 having individual member entities 313a-313n.

Figure 3C:
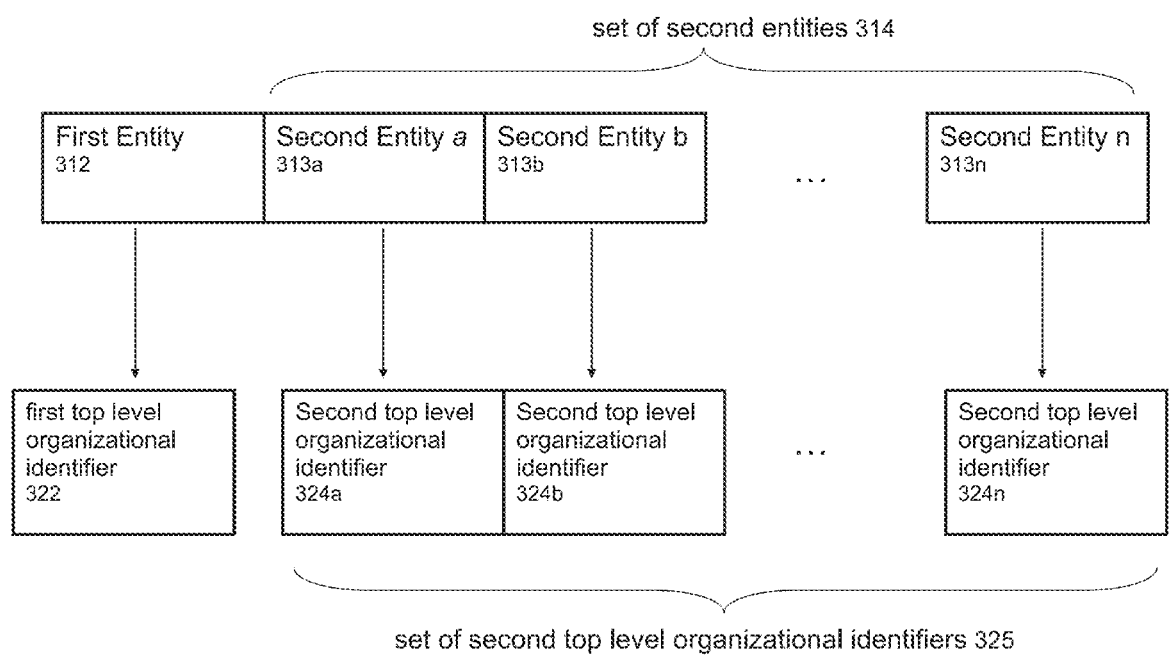
FIG. 3c illustrates top organizational identifiers matched to corresponding entities.

FIG. 3c further illustrates Top Organizational Identifiers 322, 324a-324n matched to corresponding entities included in the request as determined by identifier module 121. In one implementation, the identifier module 121 forms a set of second top level organizational identifiers 325 corresponding to the set of second entities 314. For example, the first member 324a of the set of second top level organizational Identifiers 325 corresponds to the first second entity a 313a of the set of second entities 314. The number of second entities 313 in the set of second entities 314 may be one or more. In one implementation, the identifier module 121 stores the set of second top level organizational identifiers 325 in the organizational identifier data store 132.

Figure 3D:
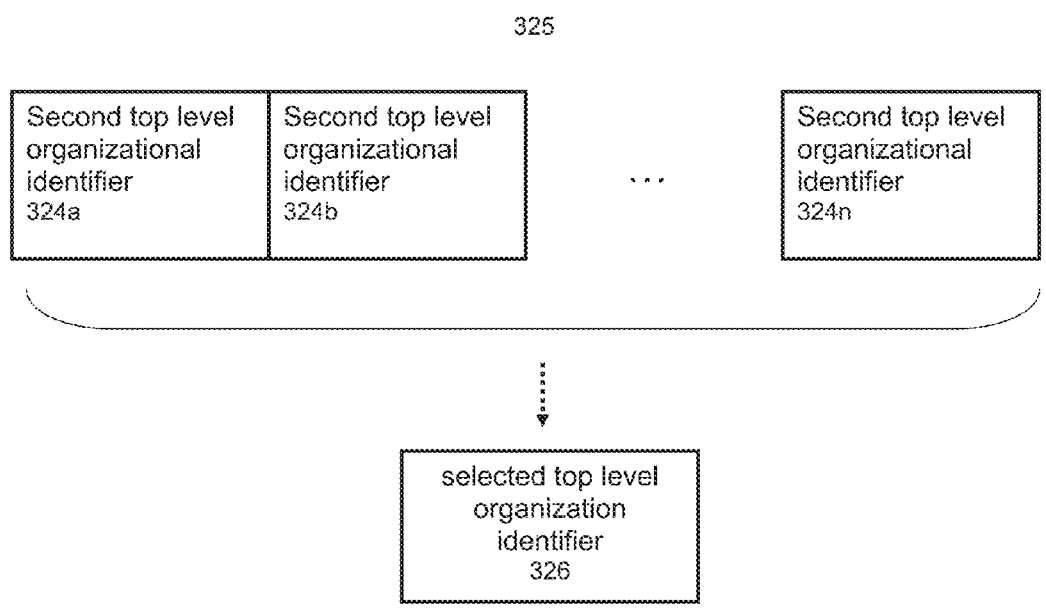
FIG. 3d illustrates selection of a selected top level organization identifier from a set of second top level organizational identifiers.
Figure 3E:
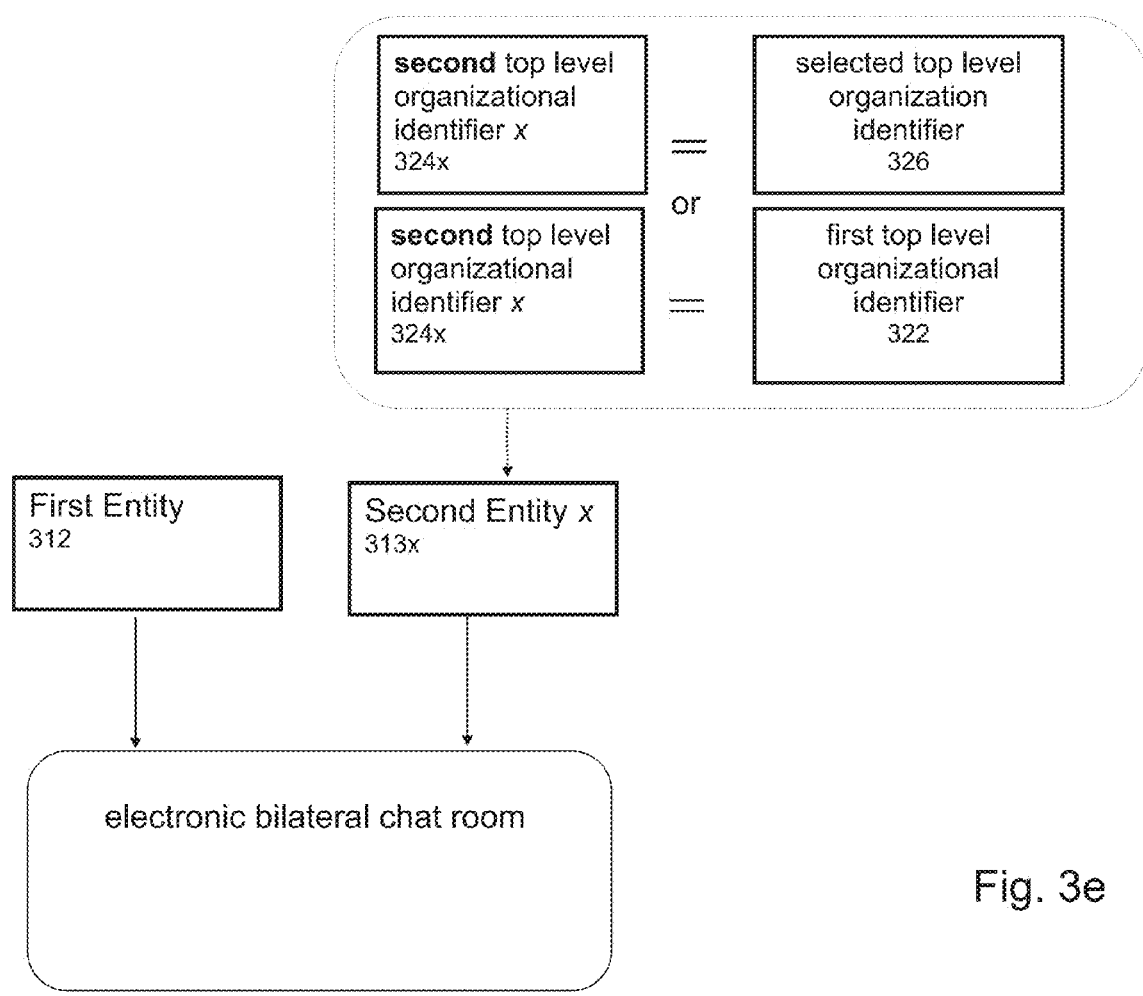
FIG. 3e illustrates a rule for adding a second entity to the bilateral chat room.

FIG. 3d shows the selection of a Selected Top Level Organization Identifier 326 from a member in the set of Second Top Level Organizational Identifiers 325. In one implementation, the identifier module 121 stores the Selected Top Level Organization Identifier 326 in the organization identifier data store 132.

FIG. 3e illustrates compliance rules used by the compliance policy engine 127 for adding the second entity into the bilateral chat room. As shown in the FIG. 3e example, to be added to a bilateral chat room, a second top level identifier associated with an entity must be equal to either the selected top level organizational identifier 326 or the first top level organizational identifier 322 before the entity can be added into the chat room by control module 124.

Referring to FIG. 4a-4e, various portions of an exemplary graphical user interface (GUI) provided by the GUI module 125 for use with a bilateral chat room is shown. In one implementation, the GUI module 125 provides a display on the user's browser 176. As shown in the FIG. 4a example, in one implementation, for example, the bilateral chat interface 400 is provided via a messaging service, such as THOMSON REUTERS EIKON MESSENGER™. In one implementation, the chat interface 400 includes a searchable list of contacts 410, a conversation list 420 identifying active conversations and the one or more chat rooms 430, existing in the non-volatile memory 120 of the server 110.

Figure 4A:
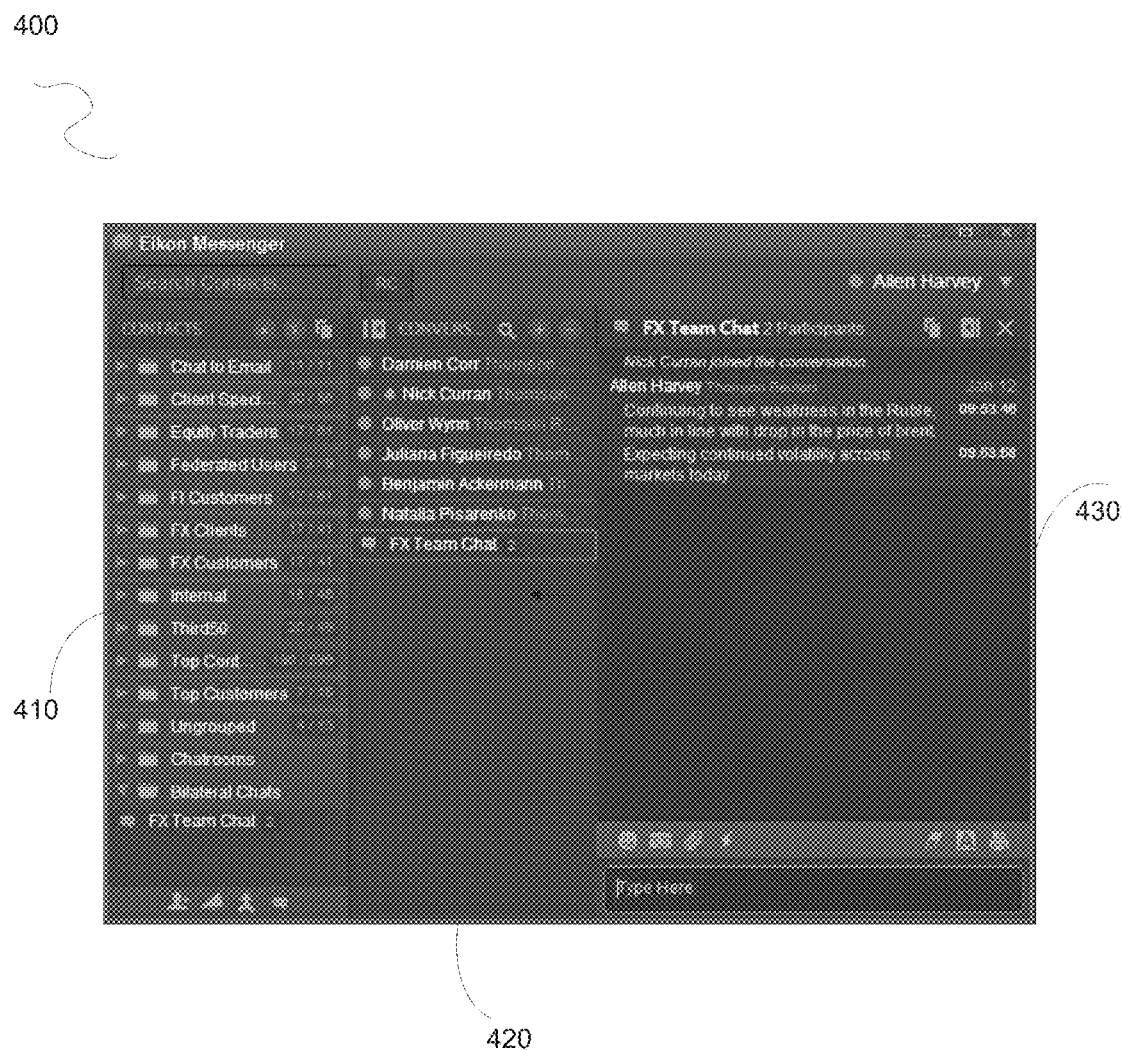
FIGS. 4a-4e illustrate different portions of an exemplary graphical user interface (GUI) for establishing a bilateral chat room.
Figure 4B:
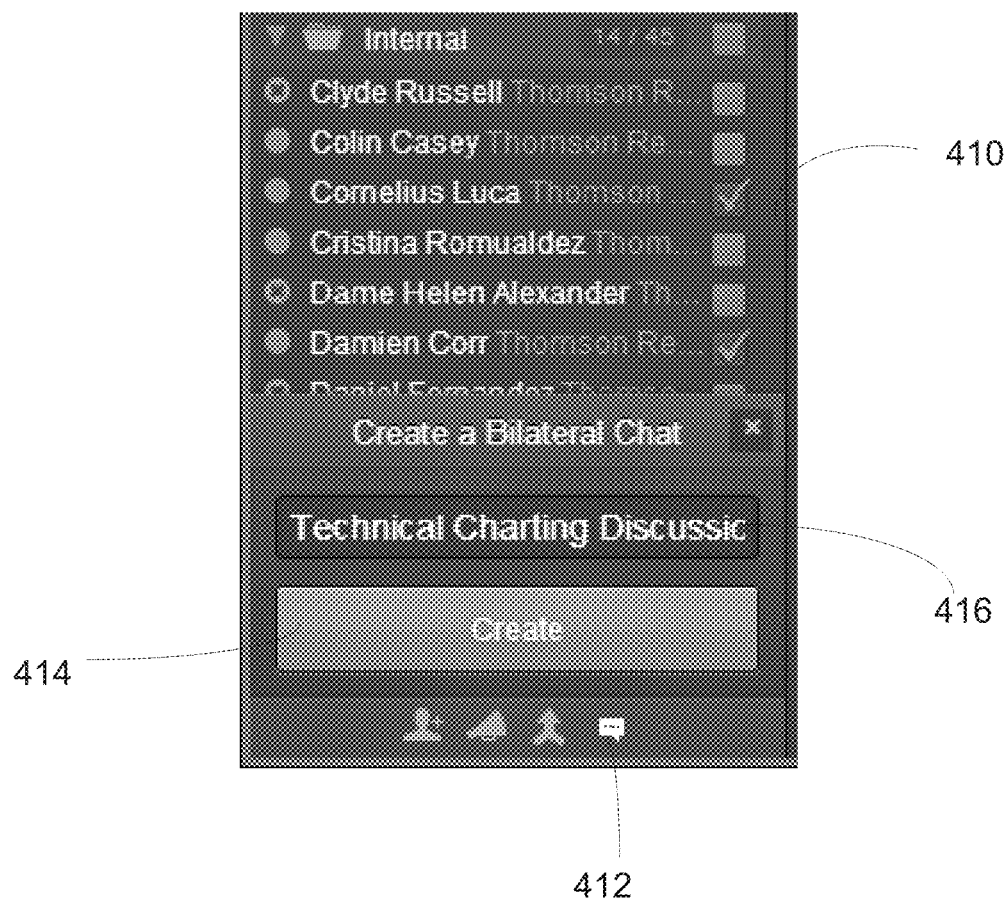

FIG. 4b illustrates selection of entities from the contact list 410. In one implementation, the contact list 410 is accessed by search module 123 through data storage 178 on the access device 172. In another implementation, entities to be included in the chat room are obtained from the directory 140 using the search module 123. Bilateral chat icon 412 is also provided and can be selected to establish the bilateral chat room. In one implementation, the name of the chat room can be designated by the user in text box 416. Once the entities are selected and the name of the room identified, the user can then select a create button 414, which invokes to control module 124 of FIG. 1 to instantiate the bilateral chat room. Each selected entities as described previously is identified from the request by the member module 122, determined by identifier module 121 and verified against the compliance policy engine 127 prior to joining the bilateral chat room.

Figure 4C:
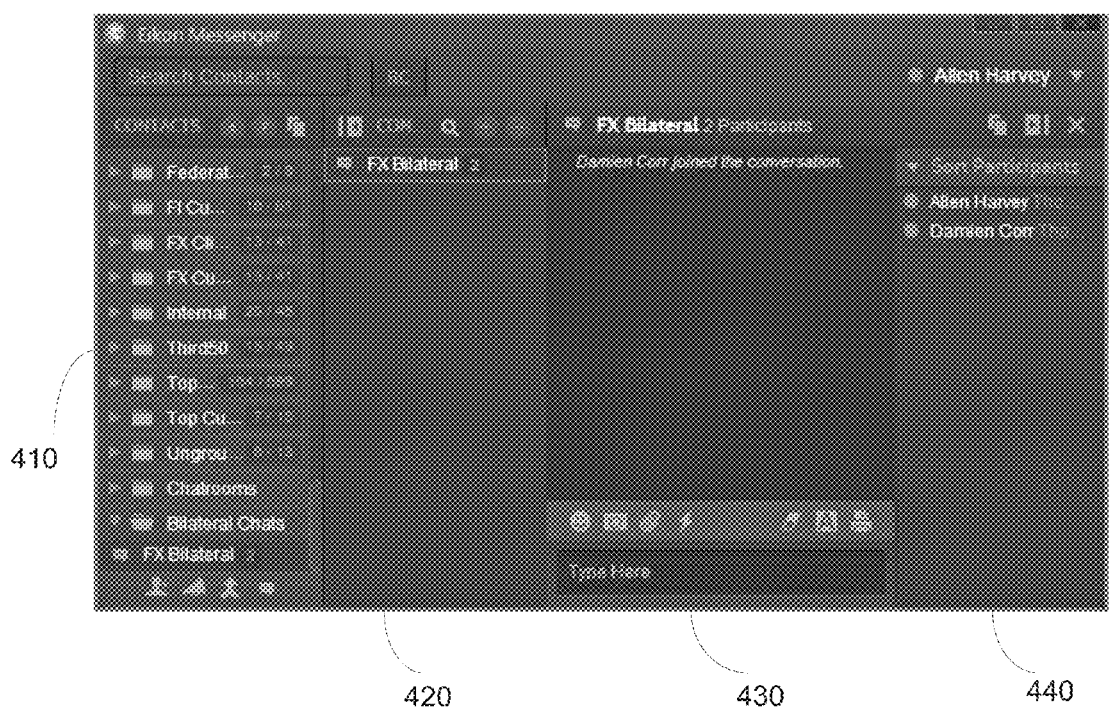

FIG. 4c illustrates a bilateral chat room with real time invites. Once the chat room is created by control module 124 and each entity identified by member module 122, determined by identifier module 121 and compared using the compliance policy engine 127, the user and invitees are automatically joined in the chat room. The bilateral chat name 416 shown in FIG. 4b is automatically added into the contact list 410. Conversation list 420 shows the conversations currently selected, in this figure, FX Bilateral. A user is provided a free form text area 430 to communicate with chat room participants. Participants of the chat and their status are shown in a Participants List 440, which in one implementation, is obtained from member module 122 and rendered through GUI module 125 on the user's browser 176.

Figure 4D:
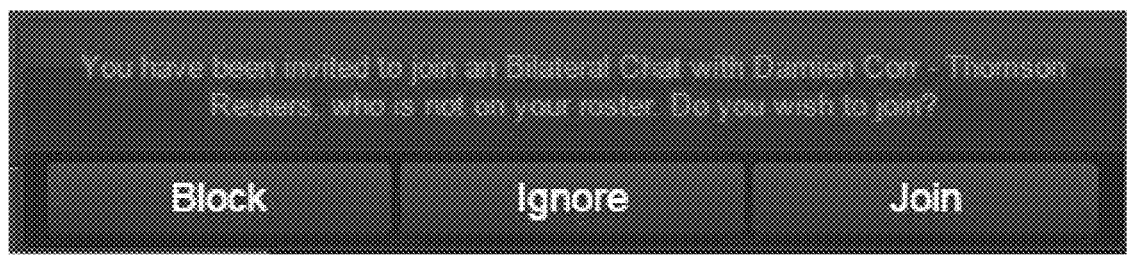
Figure 4E:
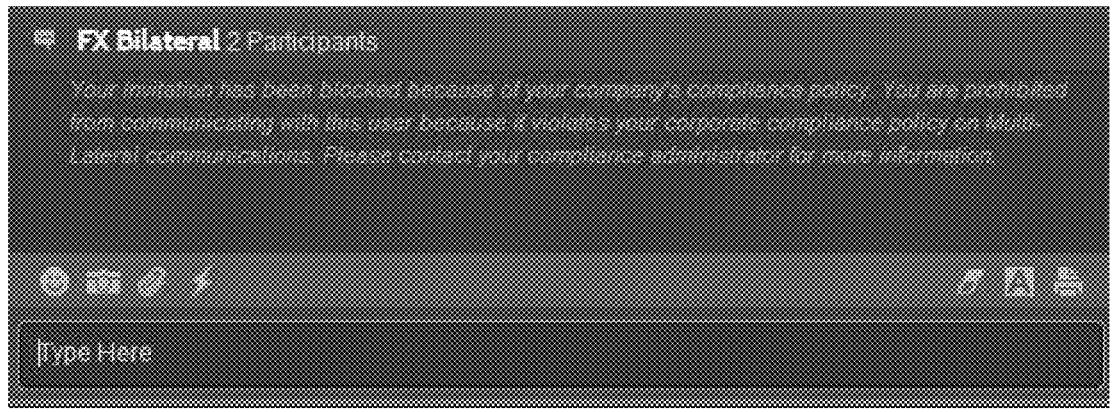

FIG. 4d illustrates an example notification received by a user when they are invited to a bilateral chat room by a requester that is not on the user's contact list. In one implementation, only users from up to two ultimate parent companies are allowed in a bilateral chat room. In another implementation, when a user is invited to a bilateral chat by someone who is on their contact list and is a member of either of the two ultimate parent companies, the user is automatically joined to the conversation and the name of the chat room is added to the user's contact list. In yet another implementation, if an entity from a third ultimate parent company is invited to the chat room, the chat interface 400 provides a compliance message displayed to the requester as illustrated in FIG. 4e, and the entity from the third ultimate parent company does not receive the invitation.

FIG. 5 provides additional examples of how organizational identifiers may be implemented in the system of the present disclosure.

FIGS. 1 through 5 are conceptual illustrations allowing for an explanation of the present disclosure. Various features of the system may be implemented in hardware, software, or a combination of hardware and software. For example, some features of the system may be implemented in one or more computer programs executing on programmable computer. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such.

What is claimed is:

1. A computer-implemented method comprising:
receiving an electronic request to establish an electronic bilateral chat room for communication between a first entity and a set of second entities;
identifying a first top level organizational identifier associated with the first entity using an organizational database, the organizational database comprising a set of hierarchal organizational relationships, the first top level organizational identifier representing a parent organization associated with the first entity;
identifying a set of second top level organization identifiers, each member of the set of second top level organization identifiers corresponding to one member of the set of second entities using the organizational database, each member of the set of second top level organization identifiers representing the parent organization associated with the corresponding member of the set of second entities;
instantiating automatically the electronic bilateral chat room;
adding automatically the first entity to the electronic bilateral chat room;
selecting one member of the set of second top level organization identifiers to form a selected top level organization identifier, the selected top level organization identifier being distinct from the first top level organizational identifier;
adding automatically at least one member of the set of second entities to the electronic bilateral chat room if the corresponding second top level organization identifiers matches the selected top level organization identifier or the first top level organizational identifier;
revalidating organization information associated with the first entity or the member of the set of second entities using information of the organizational database, if the first entity or the member of the second set of entities issues a request to rejoin the electronic bilateral chat room; and
adding the first entity or the member of the set of second entities to the electronic bilateral chat room if the organization information associated with the first entity or the member of the set of second entities matches the first top level organizational identifier or selected top level organization identifier.

2. The method of claim 1 further comprising adding automatically at least one other member of the set of second entities to the electronic bilateral chat room if the member of the set of second top level organization identifiers corresponding to the at least one member of the set of second entities matches the first top level organization identifier or the selected top level organization identifier.

3. The method of claim 1 further comprising blocking one other member of the set of second entities not associated with the first top level organizational identifier or selected top level organization identifier from joining the electronic bilateral chat room.

4. The method of claim 1 further comprising associating the electronic bilateral chat room with the first top level organizational identifier.

5. The method of claim 4 further comprising associating the electronic bilateral chat room with the selected top level organization identifier.

6. The method of claim 1 further comprising associating the electronic bilateral room with only the first top level organizational identifier and selected top level organization identifier.

7. The method of claim 1 further comprising instantiating automatically the electronic bilateral chat room in response to a request from the first entity or any member of the set of second entities.

8. The method of claim 1 further comprising terminating the electronic bilateral chat room in response to a request from the first entity or any member of the set of second entities.

9. The method of claim 1 further comprising:
searching for at least one additional entity from a local contact list; and
adding the at least one additional entity to the set of second entities.

10. The method of claim 1 further comprising:
searching for at least one additional entity from a network accessible directory; and
adding the at least one additional entity to the set of second entities.

11. The method of claim 1 further comprising identifying users of the same organization in a contact list using the information of the organizational database.

12. The method of claim 1 further comprising identifying users of the same organization in a directory using the information of the organizational database.

13. The method of claim 1 further comprising
determining whether the first entity or the member of the set of second entities is online; and
blocking electronic communications to the first entity or the member of the set of second entities if the first entity or the member of the set of second entities is not online.

14. The method of claim 1 wherein all members of the set of second entities to be added into the electronic bilateral chat room is stored in a queue.

15. The method of claim 1 further comprising terminating the electronic bilateral chat room based on an activity level associated with the electronic bilateral chat room over a predefined period of time.

16. The method of claim 1 further comprising:
determining whether an entity is associated with pre-established compliance controls that prohibit communication with at least one other entity; and
blocking electronic communications to the at least one other entity based on the determination.

17. A system comprising:
a server including a processor and memory storing instructions that, in response to receiving a request for access to a service, cause the processor to:
identify a first top level organizational identifier associated with the first entity using an organizational database in response to receiving an electronic request to establish an electronic bilateral chat room for communication between a first entity and a set of second entities, the organizational database comprising a set of hierarchal organizational relationships, the first top level organizational identifier representing a parent organization associated with the first entity;
identify a set of second top level organization identifiers, each member of the set of second top level organization identifiers corresponding to one member of the set of second entities using the organizational database in response to receiving the electronic request to establish the electronic bilateral chat room for communication between the first entity and the set of second entities, each of the member of the set of second top level organization identifiers representing the parent organization associated with the corresponding member of the set of second entities;
instantiate automatically the electronic bilateral chat room;
add automatically the first entity to the electronic bilateral chat room;
select one member of the set of second top level organization identifiers to form a selected top level organization identifier, the selected top level organization identifier being distinct from the first top level organizational identifier;
add automatically at least one member of the set of second entities to the electronic bilateral chat room if the corresponding second top level organization identifiers matches the selected top level organization identifier or the first top level organizational identifier;
revalidate organization information associated with the first entity or the member of the set of second entities using information of the organizational database, if the first entity or the member of the set of second entities issues a request to rejoin the electronic bilateral chat room; and
add the first entity or the member of the set of second entities to the electronic bilateral chat room if the organization information associated with the first entity or the member of the set of second entities matches the first top level organizational identifier or selected top level organization identifier.

18. The system of claim 17, wherein the memory stores instructions that, in response to receiving the request, cause the processor to add automatically the at least one other member of the set of second entities to the electronic bilateral chat room if the member of the set of second top level organization identifiers corresponding to the at least one member of the set of second entities matches the first top level organizational identifier or the selected top level organization identifier.

19. The system of claim 17, wherein the memory stores instructions that, in response to receiving the request, cause the processor to block one member of the set of second entities not associated with the first top level organizational identifier or selected top level organization identifier from joining the electronic bilateral chat room.

20. The system of claim 17, wherein the memory stores instructions that, in response to receiving the request, cause the processor to associate the electronic bilateral chat room with the first top level organizational identifier.

21. The system of claim 17, wherein the memory stores instructions that, in response to receiving the request, cause the processor to associate the electronic bilateral chat room with the selected top level organization identifier.

22. The system of claim 17, wherein the memory stores instructions that, in response to receiving the request, cause the processor to associate the electronic bilateral chat room with only the first top level organizational identifier and selected top level organization identifier.

23. The system of claim 17, wherein the memory stores instructions that, in response to receiving the request, cause the processor to instantiate automatically the electronic bilateral chat room in response to a request from the first entity or any member of the set of second entities.

24. The system of claim 17, wherein the memory stores instructions that, in response to receiving the request, cause the processor to terminate the electronic bilateral chat room in response to a request from the first entity or any member of the set of second entities.

25. The system of claim 17, wherein the memory stores instructions that, in response to receiving the request, cause the processor to search for at least one additional entity from a local contact list; and adding the at least one additional entity to the set of second entities.

26. The system of claim 17, wherein the memory stores instructions that, in response to receiving the request, cause the processor to:
 search for at least one additional entity from a network accessible directory; and
 add the at least one additional entity to the set of second entities.

27. The system of claim 17, wherein the memory stores instructions that, in response to receiving the request, cause the processor to determine whether an entity is online; and block electronic communications to the entity if the entity is not online.

* * * * *